(12) United States Patent
Uttamchandani et al.

(10) Patent No.: US 10,540,119 B2
(45) Date of Patent: Jan. 21, 2020

(54) DISTRIBUTED SHARED LOG STORAGE SYSTEM HAVING AN ADAPTER FOR HETEROGENOUS BIG DATA WORKLOADS

(71) Applicant: VMware, Inc., Palo Alto, CA (US)

(72) Inventors: Sandeep Uttamchandani, Cupertino, CA (US); Cheng Zhang, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 269 days.

(21) Appl. No.: 15/403,015

(22) Filed: Jan. 10, 2017

(65) Prior Publication Data

US 2018/0060143 A1 Mar. 1, 2018

Related U.S. Application Data

(60) Provisional application No. 62/437,632, filed on Dec. 21, 2016, provisional application No. 62/380,320, filed on Aug. 26, 2016.

(51) Int. Cl.
*G06F 3/06* (2006.01)

(52) U.S. Cl.
CPC .................... *G06F 3/067* (2013.01)

(58) Field of Classification Search
None
See application file for complete search history.

(56) References Cited

U.S. PATENT DOCUMENTS

| 10,095,547 | B1* | 10/2018 | Kulkarni |
| 2016/0321308 | A1* | 11/2016 | Brinnand |
| 2016/0378568 | A1* | 12/2016 | Knox |

OTHER PUBLICATIONS

Kreps, et al., "Kafka: a Distributed Messaging Systems for Log Processing," NetDB'11, Jun. 12, 2011, Athens, Greece, ACM 978-1-4503-0652-2/11/06, pp. 1-7.
Kreps, et al., "A Guide to The Kafka Protocol," https://cwiki.apache.org/confluence/display/KAFKA/A+Guide+To+The+Kafka+Protocol#AGuideToTheKafkaProtocol-ProduceAPI.
"Apache Kafka, A high-throughput distributed messaging system," http://kafka.apache.org/documentation.html#api, 2014.
Balakrishnan, et al., "CORFU: A Shared Log Design for Flash Clusters," 9th USENIX Symposium on Networked Systems Design and Implementation (NSDI '12), Apr. 1, 2012, pp. 1-14.
Balakrishnan, et al., "CORFU: A Distributed Shared Log," ACM Transactions on Computer Systems, vol. 31, No. 4, Article 10, Dec. 2013, pp. 1-24.

* cited by examiner

*Primary Examiner* — Syed A Roni
(74) *Attorney, Agent, or Firm* — Patterson + Sheridan, LLP

(57) ABSTRACT

A distributed shared log storage system employs an adapter that translates Application Programming Interfaces (APIs) for a big data application to APIs of the distributed shared log storage system. An instance of an adapter is configured for different big data applications in accordance with a profile thereof, so that the big data applications can take on a variety of added characteristics to enhance the application and/or to improve the performance of the application. Included in the added characteristics are global or local ordering of operations, replication of operations according to different replication models, making the operations atomic and caching.

20 Claims, 14 Drawing Sheets

DISTRIBUTED SHARED LOG STORAGE SYSTEM HAVING AN ADAPTER FOR HETEROGENOUS BIG DATA WORKLOADS

CROSS-REFERENCE TO RELATED APPLICATIONS

This application claims the benefit of U.S. Provisional Application No. 62/380,320, filed Aug. 26, 2016, and U.S. Provisional Application No. 62/437,632, filed Dec. 21, 2016, both of which are incorporated by reference herein.

BACKGROUND

The need for large and fast data stores in cloud computing has increased with widespread adoption of big data applications. These data stores need to be able to scale up to support hundreds of thousands of concurrent client operations per second, while still maintaining the data reliably. However, each of the big data applications in the cloud operates according to a different paradigm. For example, the Hadoop® paradigm is different from the SQL® paradigm, which is different from the Kafka™ paradigm. This has required that cloud computing providers dedicate different clusters to these different paradigms, resulting in inefficient use of the clusters and difficulty in managing a large variety of clusters.

DETAILED DESCRIPTION

Embodiments provide a distributed shared log storage system to support data storage demands of big data workloads. In one embodiment, the distributed shared log storage system known as Corfu is used. In contrast to typical big data applications, such as Kafka, which applies namespace sharding on topics that are further divided into partitions, a distributed shared log storage system, such as Corfu, partitions the namespace across log unit servers in time rather than according to namespace and thus allows access to the entire namespace from any client. This enables extreme scaling and richer ordering guarantees, although it is at the expense of performance overheads due to serialization and distributed state.

Figure 1:
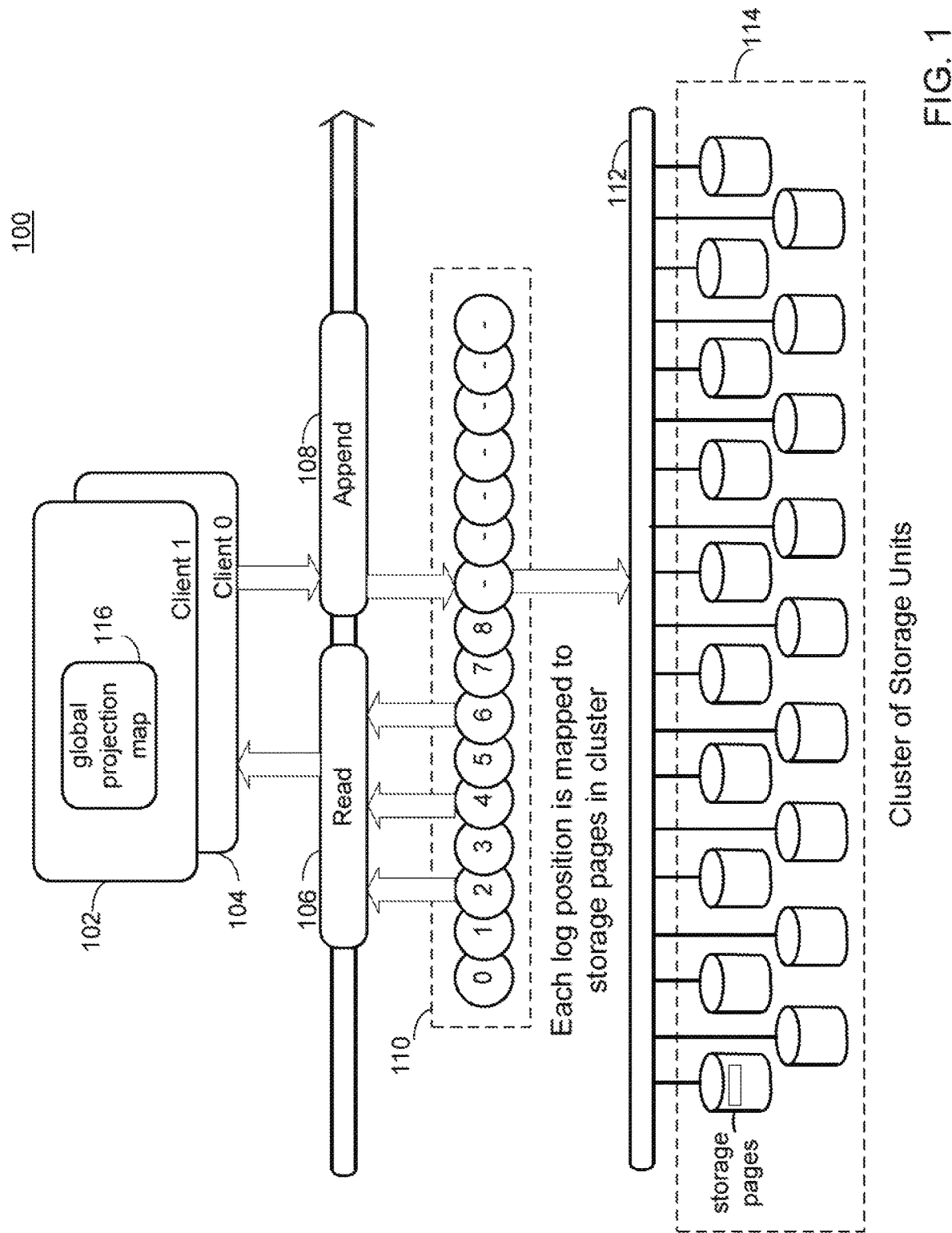
FIG. 1 is a block diagram of a distributed shared log storage system in which embodiments may be practiced.

FIG. 1 is a block diagram of a distributed shared log storage system in which embodiments may be practiced. The system depicted includes one or more clients 102, 104, each having a global projection map 116, a shared log 110, and a cluster of storage units 114, each of which has a plurality of storage pages. Each position in the shared log is projected onto the storage pages in the cluster of storage units by means of global projection map 116. A client 102, 104 can read anywhere in shared log 110 but may only append to shared log 110, i.e., write to the end of shared log 110. Thus, shared log 110 is a read-many, write-append distributed log.

The distributed shared log storage system supports multiple clients 102, 104, which means that more than one client can concurrently attempt to append to shared log 110. The system employs a central sequencer (206, FIG. 2) to prevent multiple clients 102, 104 from writing to the same log position, thereby guaranteeing that each log position is only written once.

Global projection map 116 can be changed at any time and integers called epoch numbers sequentially mark each version of the map. When the map is retired, e.g., by a seal operation, a new map is created and a new epoch number is assigned.

Figure 2:
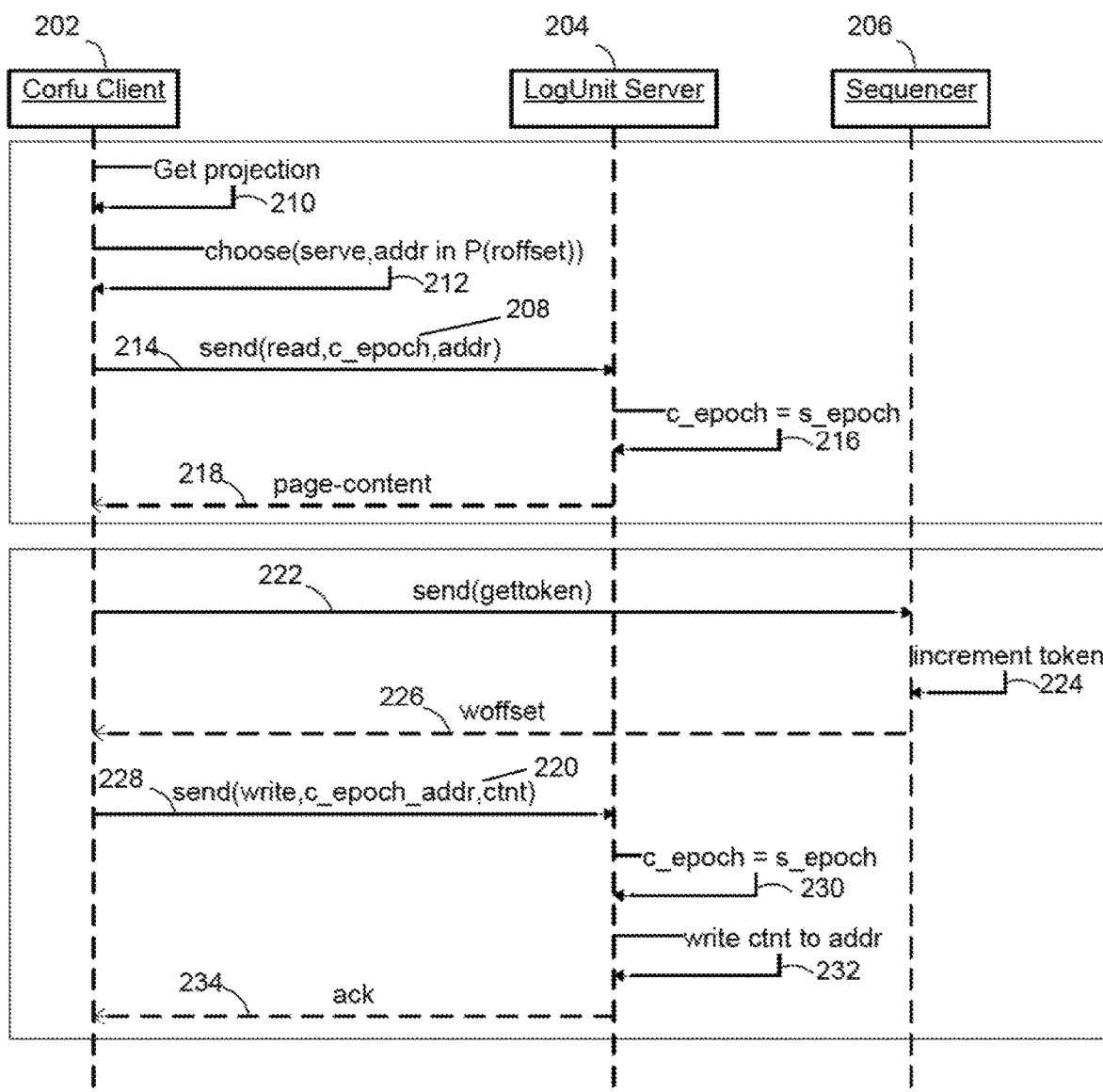
FIG. 2 is a sequence diagram of read and write operations carried out in the distributed shared log storage system.

FIG. 2 is a sequence diagram of a read operation 208 and a write operation 220 carried out in the distributed shared log storage system. For a read, the client (depicted in FIG. 2 as client 202) in step 210 gets the current projection map, and then chooses, in step 212, a server and an address using the current projection map from which the data is to be read. The client then sends a read command in step 214 to a particular log unit server (which is the storage unit depicted in FIG. 2 as log unit server 204) with the current epoch number. The log unit server checks the epoch number in step 216, performs the read, and returns the data in step 218. Sequencer 206 is not involved in read operation 208 because reads of the shared log are permitted at any position in the log.

For a write, the client write first obtains in steps 222 and 226 a token and write offset from the sequencer 206. Then, using the current projection map, the client sends in step 228 a write command to the log unit server with the current epoch, address and content to be appended to the log at the write offset. The log unit server checks to see if the current epoch matches the server epoch in step 230, and if so, performs the write in step 232 and sends an acknowledgment to the client in step 234 to indicate that the log unit server succeeded in writing the content to the specified address.

Figure 3:
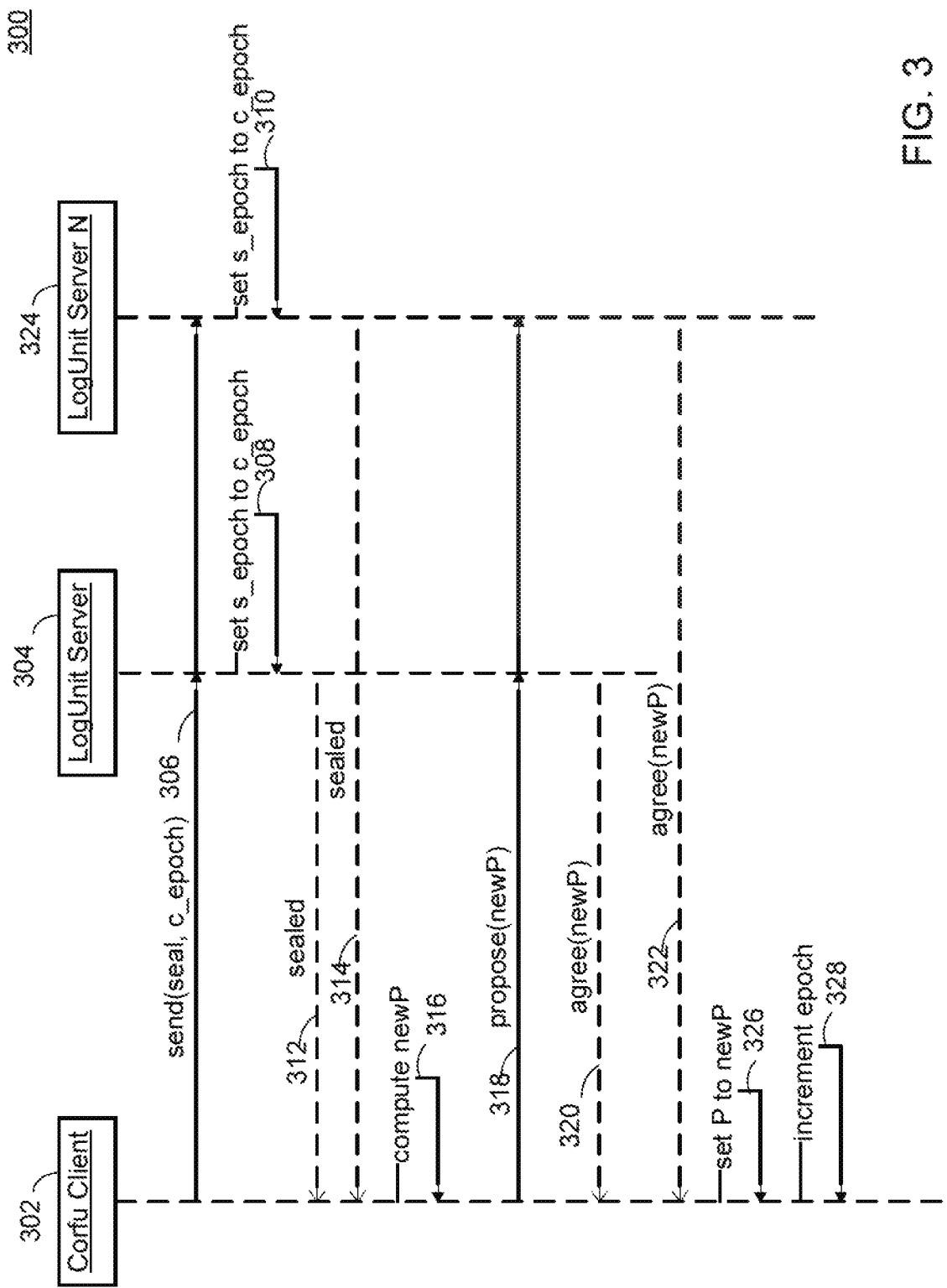
FIG. 3 is a sequence diagram of a reconfiguration operation carried out in the distributed shared log storage system.

FIG. 3 is a sequence diagram of a reconfiguration operation carried out in the distributed shared log storage system. Reconfiguration operation 300 is carried out when and if there is a failure in a log unit server so that contents of global projection map 116 can be modified accordingly. The ability to change the projection map during a reconfiguration allows new storage units (described herein as log unit servers) to be added and mapped, as needed.

In FIG. 3, the client (depicted in FIG. 3 as client 302) first sends a seal command with the current epoch in step 306 to all of the log unit servers (depicted in FIG. 3 as log unit servers 304-324). Each log unit server then checks to see if the current epoch matches the server epoch in steps 308, 310, and if so, acknowledges in steps 312, 314 that the projection map is sealed, meaning that it can no longer be used. The client then computes a new projection map in step 316 and proposes the new projection map in step 318 to the log unit servers. When all or a majority of the log unit servers agree with the proposed new projection map (steps 320, 322), the client sets the new projection map in step 326 and the epoch number is incremented in step 328 so that the old projection map cannot be used.

Figure 4:
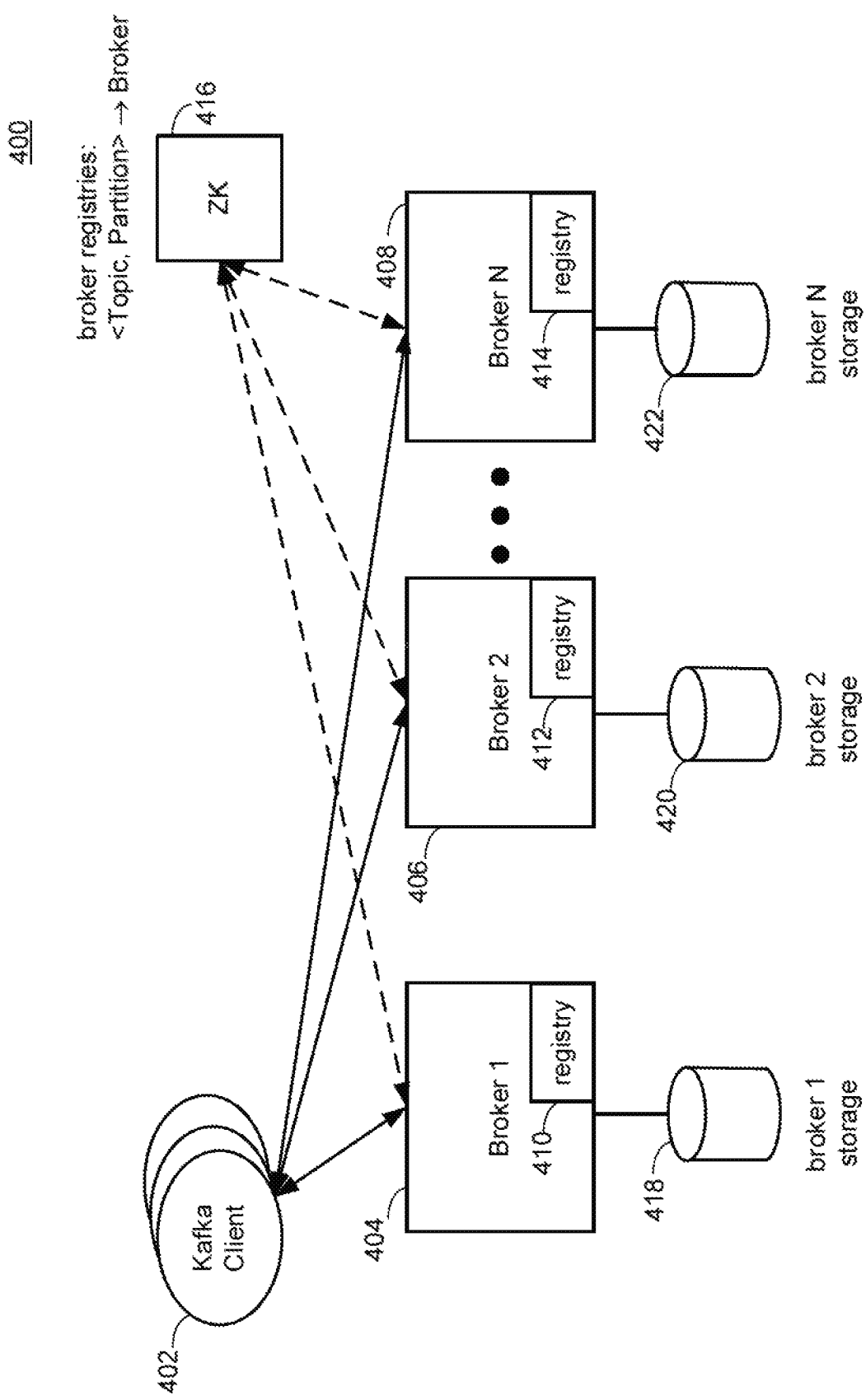
FIG. 4 is a conceptual diagram depicting an operation of an example big data application that generates one of the heterogeneous big data workloads.

FIG. 4 is a conceptual diagram depicting an operation of an example big data application that generates one of the heterogeneous big data workloads. The example big data application is Kafka, which implements a concurrent producer/consumer messaging application. As depicted, each Kafka client 402, which is either a producer or a consumer of messages, is able to communicate with a plurality of brokers 404, 406, 408, which store the messages in storage devices 418, 420, 422 attached to the brokers. Typically, one of the brokers 404, 406, 408 is declared a leader for a partition and the others, followers. The followers store replica partition data to provide high availability and failure-tolerance.

A message or message stream is associated with a topic, which is divided into multiple partitions. The partitions are distributed over the plurality of brokers 404, 406, 408 to support high degrees of concurrency and throughput.

A message is "produced" by appending it to the end of a particular partition for the topic. A message can only be consumed after it is produced and stored in one of the brokers and messages in a particular partition must be consumed in the order in which the partition stores them. The point in a partition at which a consumer consumes message is called the offset. A zookeeper service (ZK) 416 includes a registry that keeps track of the mapping between a <topic, partition> pair and a broker, which handles the <topic, partition> pair. In some embodiments, each of the brokers 404, 406, 408 may include a copy 410, 412, 414 of the registry.

Figure 5:
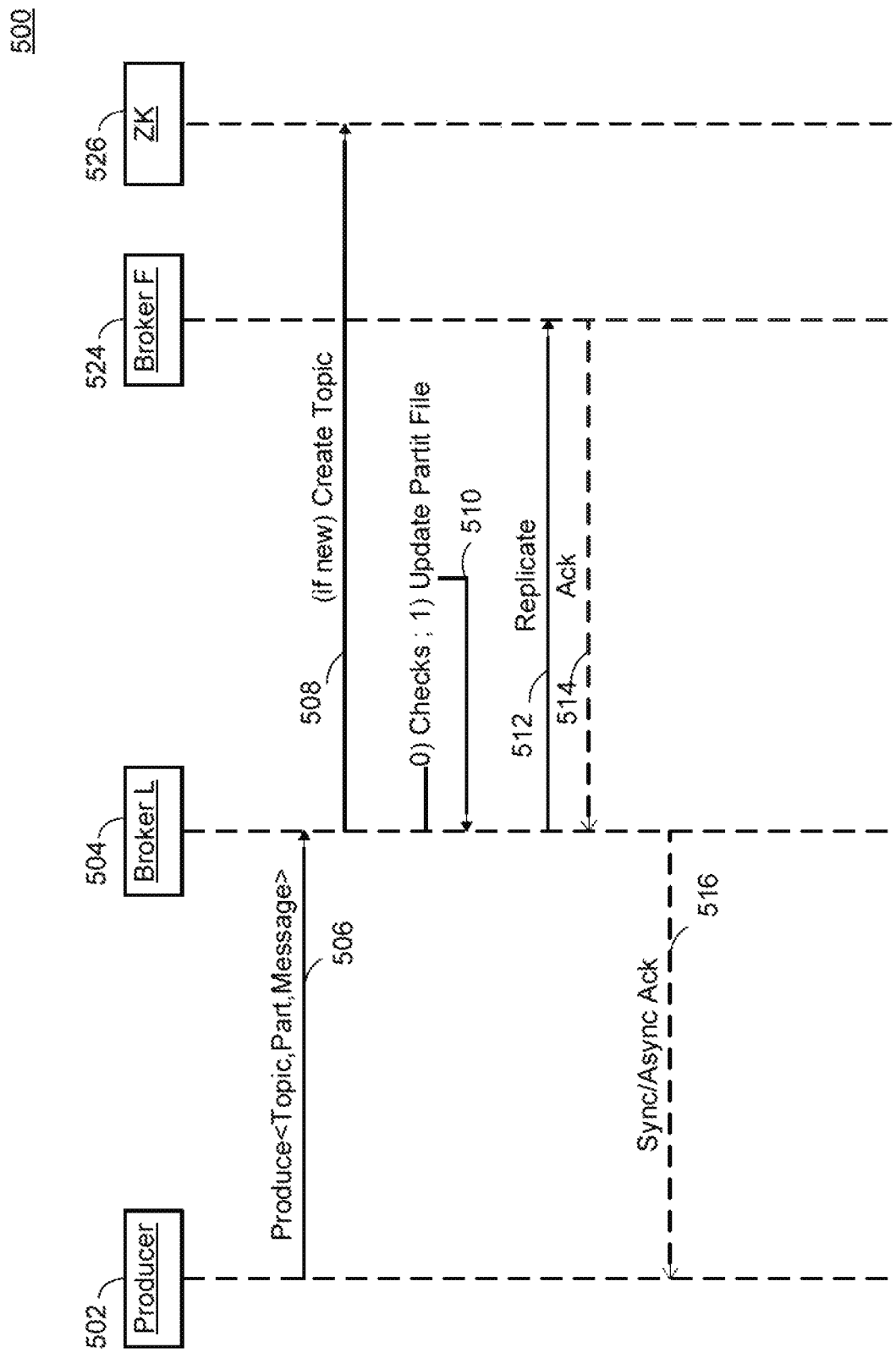
FIG. 5 is a sequence diagram of a produce operation carried out in the big data application depicted in FIG. 4.

FIG. 5 is a sequence diagram of a produce operation 500 carried out in the Kafka system depicted in FIG. 4. As depicted, a producer 502 sends in step 506 a message to a broker 504 (Broker L, the leader for the topic) naming the <topic, partition> pair to which the message belongs. If the topic is new, it is created in step 508 and registered with the zookeeper 526. Next, the broker 504 performs certain checks, updates the partition file with new message in step 510 and requests that a broker follower (BF) 524 store in step 512 a replica. Upon receiving an acknowledgment from the broker follower in step 514, the broker leader 504 sends an acknowledgment in step 516 to the producer 502. The acknowledgment can include the topic name, partition and offset in the partition at which the message is stored.

It should be noted that more complex producer operations are possible. A producer can, in one command, send a set of messages to each partition in a list of partitions for each topic in a list of topics.

Figure 6:
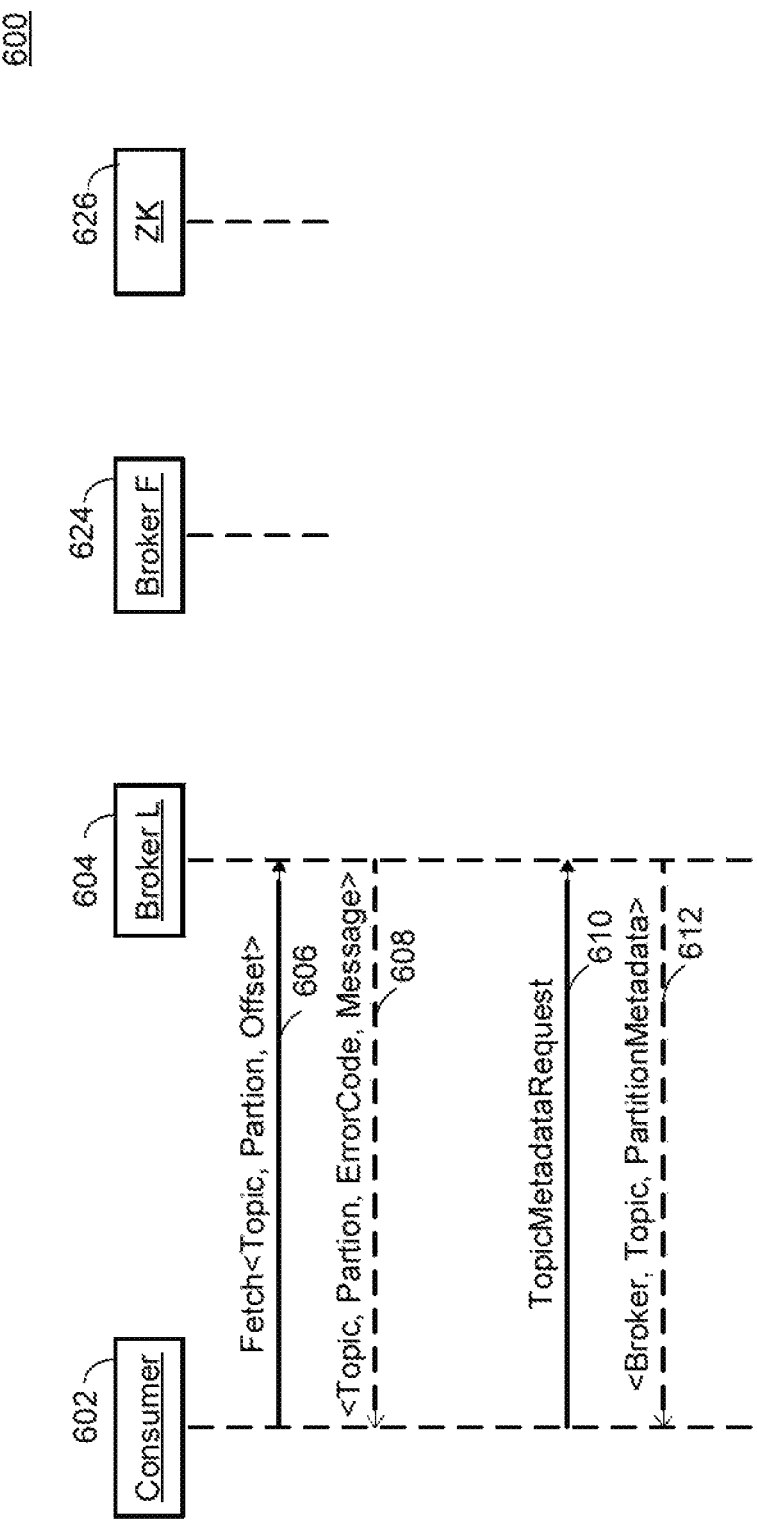
FIG. 6 is a sequence diagram of a consume operation carried out in the big data application depicted in FIG. 4.

FIG. 6 is a sequence diagram of a fetch operation 600 carried out in the Kafka system depicted in FIG. 4. As depicted, a consumer 602 sends in step 606 a message to a broker 604 (Broker L) to fetch a message located at a particular offset within a partition of a particular topic. In response, the broker 604 returns the requested message <Topic, Partition, ErrorCode, Message> in step 608, where the ErrorCode field can convey any error, such as 'broker not owner', encountered by the fetch. The consumer 602 can also make a metadata request in step 610 regarding a particular topic. In response, the broker 604 or brokers 604-624 return in step 612 to the consumer <Broker, Topic, PartitionMetadata> which includes an ID of the partition, the broker leader in charge of the partition, and any replica brokers (broker followers) for the partition.

It should be noted that more complex fetch operations are possible. A consumer can, in one command, fetch a specified maximum number of bytes from each partition in a list of partitions for each topic in a list of topics.

Figure 7:
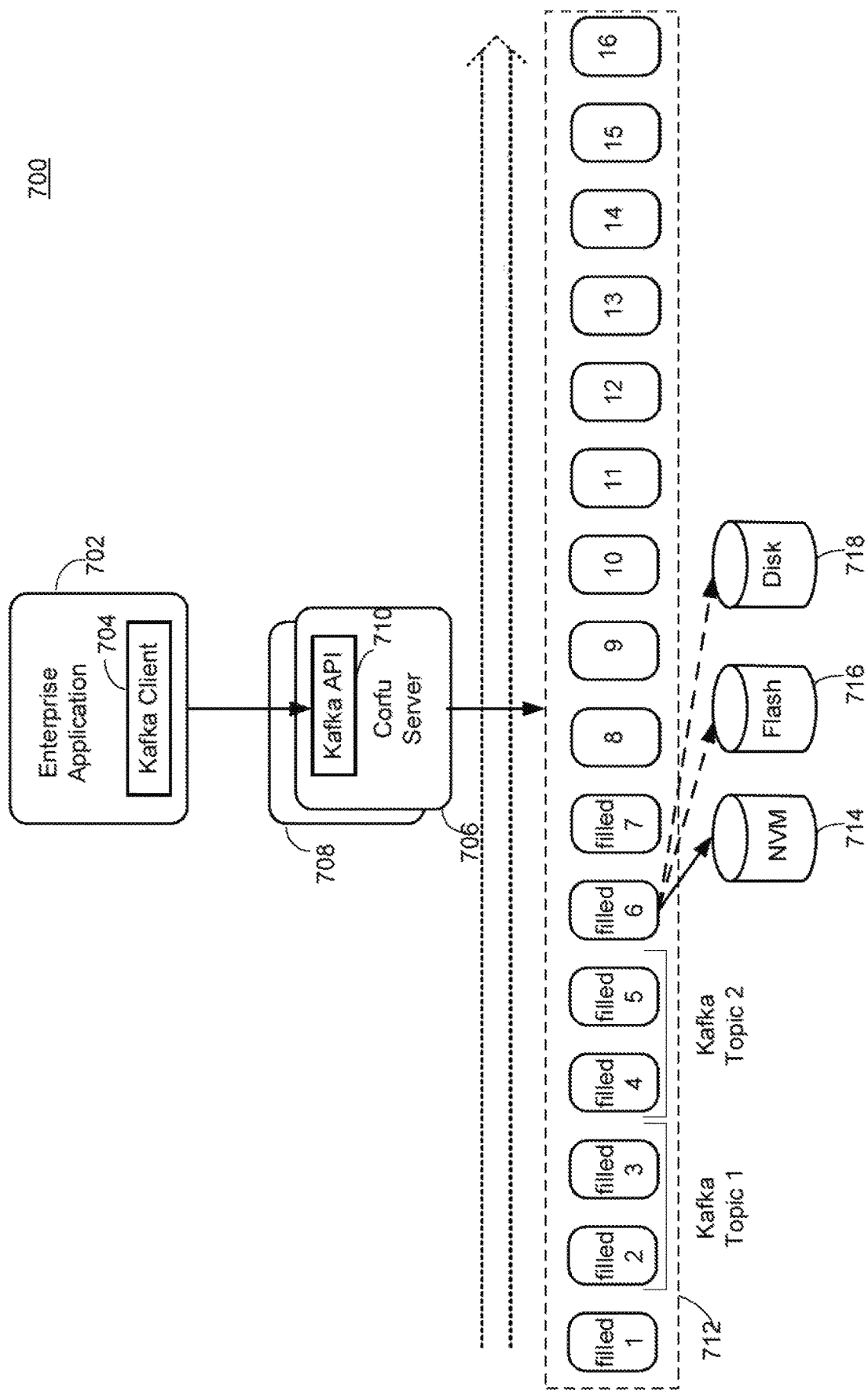
FIG. 7 is a block diagram of the distributed shared log storage system that supports the big data application depicted in FIG. 4.

FIG. 7 is a block diagram of the distributed shared log storage system that supports the Kafka system depicted in FIG. 4. As illustrated, an enterprise application 702 includes a Kafka client 704, which interacts with a Kafka Applications Programming Interface (API) 710 that is supported by the distributed shared log storage system according to embodiments (e.g., Corfu servers 706, 708). The Corfu servers 706, 708 provide the persistent storage that is needed for the Kafka application. As depicted in FIG. 7, the Corfu append log 712 in storage is only partially filled. Items 2 and 3 in the log contain Kafka Topic 1 and items 4 and 5 contain Kafka Topic 2. It should be recognized that storage pages in the append log 712 can be backed by non-volatile memory 714, flash memory 716, and/or disk 718.

Figure 8:
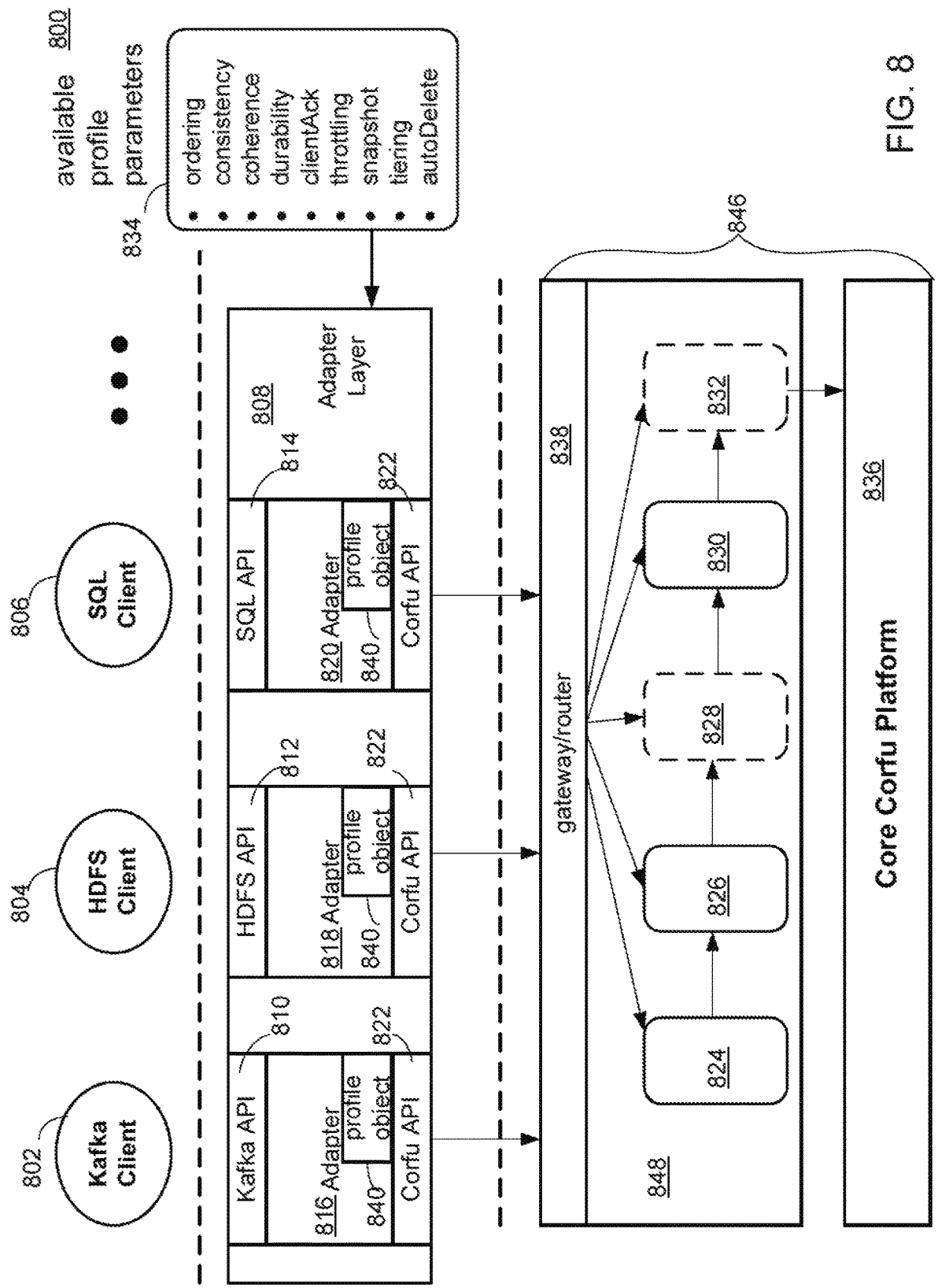
FIG. 8 is a block diagram of the distributed shared log storage system supporting heterogeneous big data applications.

In order for Corfu servers 706, 708 to provide the persistent storage that is needed for the Kafka application or other big data application, an adapter layer 808 shown in FIG. 8 translates the Kafka or other big data application APIs into Corfu APIs.

FIG. 8 depicts a block diagram of the distributed shared log storage system supporting heterogeneous big data applications, including Kafka.

As depicted in FIG. 8, the system includes various clients 802, 804, 806 and adapters 816, 818, 820 residing in an adapter layer 808, and an extended Corfu platform 846.

Each client 802, 804, 806 is present for a different type of application, such as Kafka, the file system of Hadoop, and SQL. The clients 802, 804, 806 make requests for operations relating to the type of application of the client. For example, the Kafka client 802 makes Fetch and Produce requests such as those depicted in FIGS. 5 and 6.

For each type of client an adapter 816, 818, 820 is present. Each adapter 816, 818, 820 includes a profile object 840, which contains a list of <operation, profile> pairs where a profile is <parameter, value> pair in accordance with the profile parameters available in the list 834 and Table 1 below. For example, an <operation, profile_entry> pair in the profile object 840 for a Kafka client the operation may be may be fetch<topic, partition, offset> and the profile_entry may be <ordering, global>.

TABLE 1

| arameter | Possible value | Possible value | Possible value |
| --- | --- | --- | --- |
| ordering | global | local | None |
| consistency | strong | weak | stale |
| coherence | atomic | stale | — |
| durability | strong | normal | fragile |
| clientAck | push | pull | — |
| throttling | True | False | — |
| snapshot | True | False | — |
| tiering | True | False | — |
| autoDelete | True | False | — |

The core Corfu platform 836 is a Corfu system such as that shown in FIG. 1. Logically positioned between the adapter layer 808 and the core Corfu platform 836, are a gateway/router layer 838 and a processing layer 848 that includes a set of library modules 824, 826, 828, 830, 832 thus forming an extended Corfu platform 846. The library modules 824, 826, 828, 830, 832 perform operations that are prescribed and organized by the gateway/router 838 based on a received profile object 840 and aided by the various facilities available from the core Corfu platform 836. As shown, library modules 824, 826 and 830 are prescribed by the received profile object, while modules 828 and 832 are not prescribed and are thus bypassed.

Library modules 824, 826, 828, 830, 832 in one embodiment include conflict detection, concurrency control, replica repair, replication, failure detection, failure recovery, caching, tiering, data access optimization, load balancing, auto scaling, continuous monitoring, configuration management, security/tenancy, and upgrade/bootstrap/maintenance. In one embodiment, the load balancing library module includes software for enforcing local or global ordering of update operations in Corfu. The Security/Tenancy module applies an appropriate Quality of Service policy and access control policy. The concurrency module selects a particular read-write coherence implementation. The replication module selects a replica from which to read data. The tiering library decides which tier to read from. The caching module decides between caching and no caching of data. The auto-scaling module decides whether to instantiate a new adapter for the client operation or using an existing instance.

Figure 9:
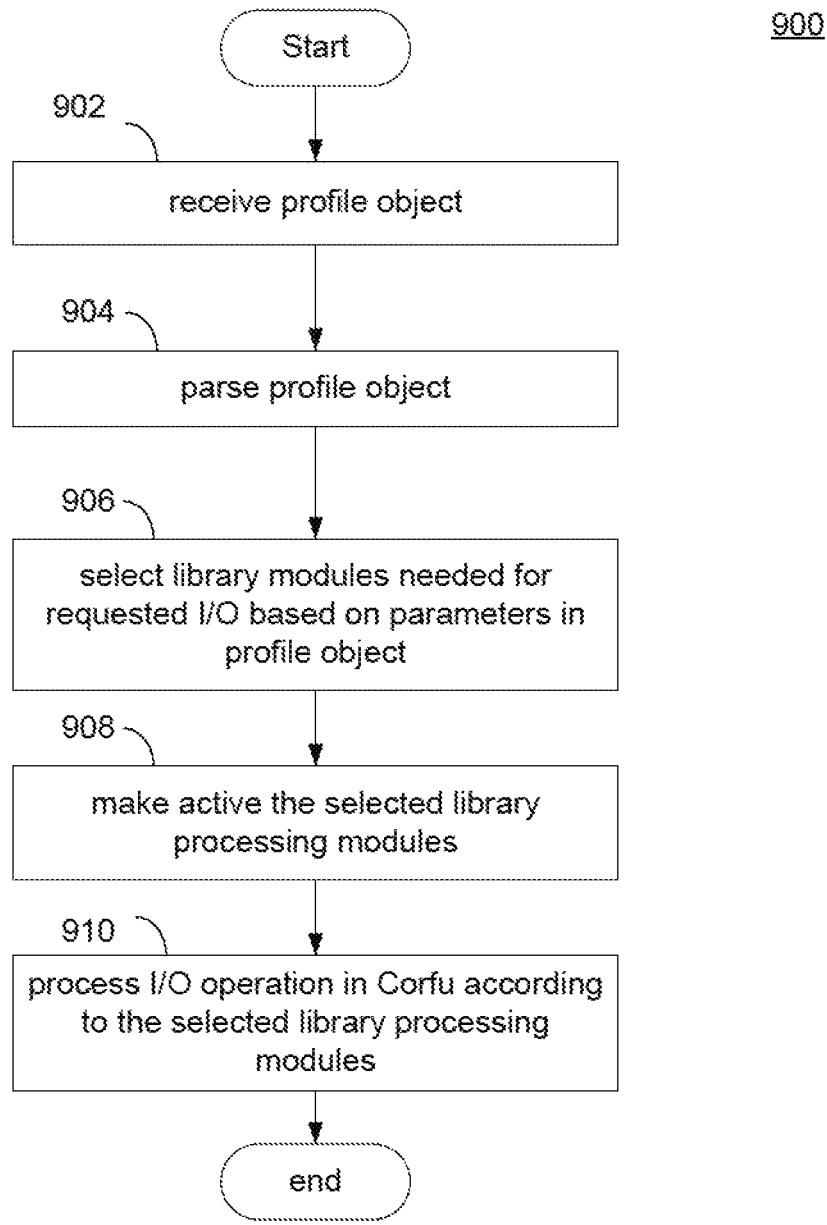
FIG. 9 depicts an example flow for configuring a client operation for processing.

FIG. 9 depicts an example flow 900 for configuring a client operation for processing. In step 902, the gateway receives a profile object 840 containing profile information according to Table 1. The gateway/router 838 then parses in step 904 the received profile object 840 and selects in step 906 the library modules 824, 826, 830 needed to carry out the client operation based on the parameters in the profile object. The gateway/router 838 then makes active the selected library processing modules. Library modules are arranged in a pre-determined order but only the selected library modules 824, 826, 830 are activated; the other available modules 828, 832 are not activated and thus bypassed. In step 910, the gateway/router processes the requested I/O operation according to the selected library processing modules with the aid of the core Corfu platform 836.

Operation in accordance with FIG. 9 permits the operations of a client to be performed in ways that provide added or altered characteristics to the native operation of an application based on the library modules available for the client type.

For example, if a Kafka client requests a produce<topic1, partition1> operation but specifies that it be locally ordered with respect to produce operations on topic1, partition1, then the gateway/router layer receives a request with a profile object specifying local ordering for the produce operation. The gateway/router layer 838 accesses the load balancer library to select the type of sequencer to use, which in the example, is a new separate instance of a sequencer that pertains to only the <topic1, partition1> pair specified in the produce operation. In this manner, local ordering is maintained for specified <topic, partition pairs>.

Another example is one in which the Kafka client requests that a produce<topic, partition> operation occur according to a particular replication policy. The replication library module includes a strong consistency model in which all replicas in Corfu are updated, a chain replication policy in which that replicas are eventually consistent, and a quorum replication policy in which a majority of replicas are updated. If the Kafka client requests that the produce<topic, partition> operation be performed with strong consistency, then the gateway/router layer receives a profile object in which the produce<topic, partition> operation has an associated <replication, strong> pair. The gateway then parses the profile object and invokes the replication library module for strong consistency with respect to the specified topic and partition. The processing layer then arranges to use the strong consistency library module and performs an update in Corfu with the strong consistency module causing all of the replicas in Corfu be updated. If chain replication is specified, then reads and writes to the <topic, partition> pair are guaranteed to be monotonic and the replicas will eventually become consistent. If quorum replication is specified, then reads and writes succeed as long as a majority of replicas is available, but reads and writes are not guaranteed to be monotonic.

Thus, modifications of an individual client operations are possible, thus transforming the native behavior of an application into entirely different behavior, in effect creating a new application. Native Kafka can be transformed into an application that includes global ordering or local ordering, or one that has strong or weak consistency. Additionally, Kafka, which is weak with respect to data durability, can be transformed to endow it with ACID (Atomicity, Consistency, Isolation and Durability) properties, wherein fetch and produce operations become atomic by performing them with a two-phase commit protocol.

This is true for other big data applications, such as Spark, HDFS and SQL, for which adapters are provided to convert the APIs of these big data application into Corfu APIs according to a client-selected profile parameter.

Figure 10:
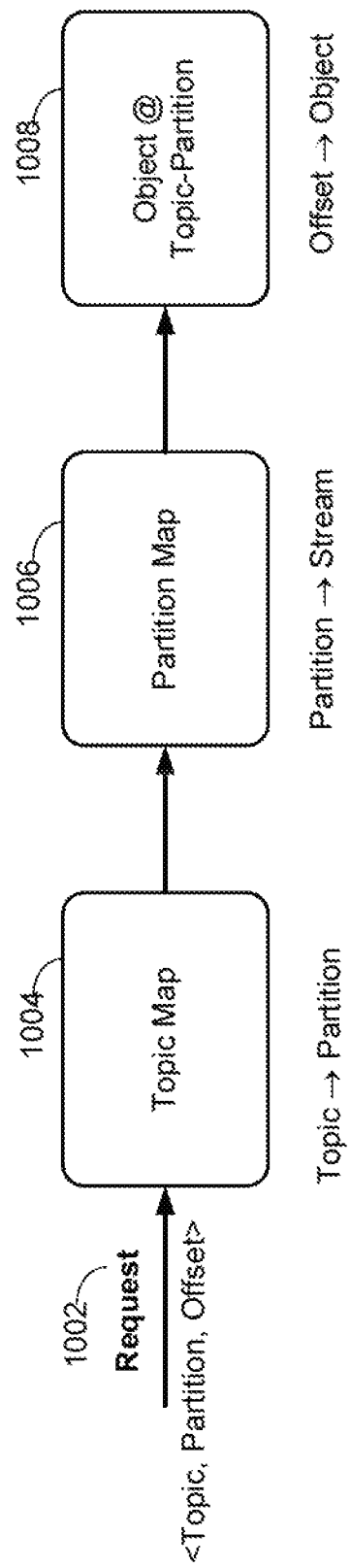
FIG. 10 depicts mappings employed by the distributed shared log storage system to support big data applications.

FIG. 10 depicts mappings employed in the adapter layer of the distributed shared log storage system to support big data applications, in particular the Kafka system. Maps 1000 include a topic map 1004, a partition map 1006 and an object table 1008 at the topic-partition location. Maps take in a request 1002 in the form of a tuple <topic, partition, offset> and return an object for the <topic, partition, offset> that is requested. Specifically, topic map 1004 translates a topic name to a partition. Partition map 1006 translates the partition to a stream and object table 1008 translates the offset to a position in the stream of the object. In one embodiment, topic map 1004 has a key-value pair where the keys are the topics and the value maps to a partition, which is also a key-value pair. Partition map 1006 then uses its keys for the partitions and the values to map to the Stream/SMRObject. The object table of SMRObjects is also a key-value pair store, where the keys are the offsets and the values are the data. SMRObjects, which are available as an API provided by Corfu, are used for their atomic read/write guarantees.

FIGS. 11-14 depict operations using the mappings in the adapter layer as depicted in FIG. 10 and Corfu.

Figure 11:
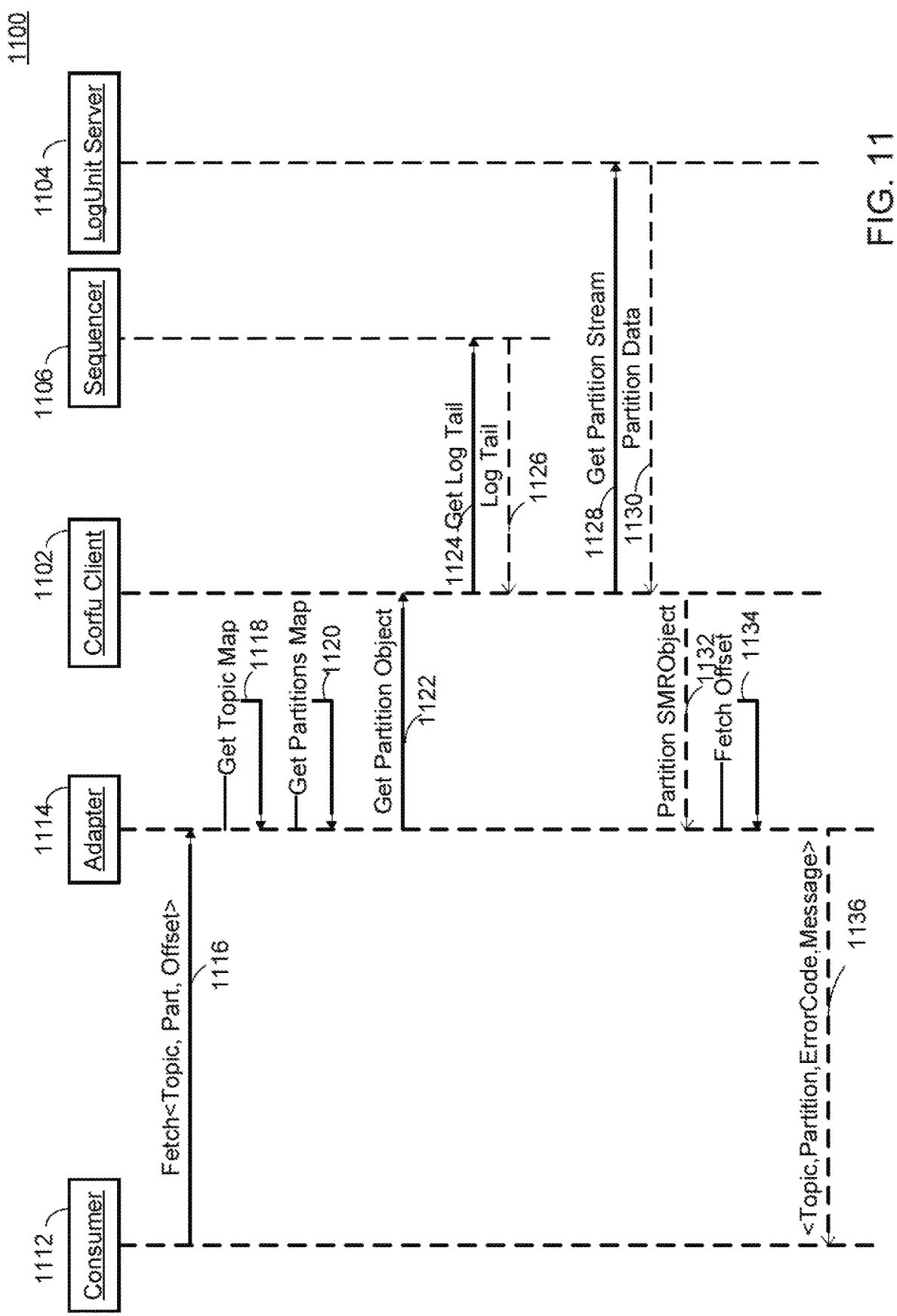
FIG. 11 is a sequence diagram of a first embodiment of an operation carried out in the distributed shared log storage system to support the fetch operation depicted in FIG. 6.

FIG. 11 is a sequence diagram of a first embodiment of an operation carried out in the distributed shared log storage system to support the consume operation depicted in FIG. 6. In FIG. 11, a consumer 1112 sends a fetch<Topic, Partition, Offset> request to adapter 1114 in step 1116. In response, adapter 1114 accesses the topic map in step 1118 and the partition map in step 1120, and then requests the partition object in step 1122 from Corfu client 1102. Corfu client 1102 requests and gets the log tail from sequencer 1106 in steps 1124 and 1126 to make sure it has the latest data, and requests the partition stream in step 1128 from log unit server 1104. The partition data is then returned in step 1130 from log unit server 1104 to Corfu client 1102, which then passes the partition object to adapter 1114 in step 1032. Adapter 1114 then uses the provided offset to obtain the requested data in step 1134, which it then returns to consumer 1112 in step 1136. In this embodiment, an extra I/O is incurred to obtain the partition object and a data fetch I/O is incurred, as data is returned to the consumer only after obtaining it from the Corfu system.

Figure 12:
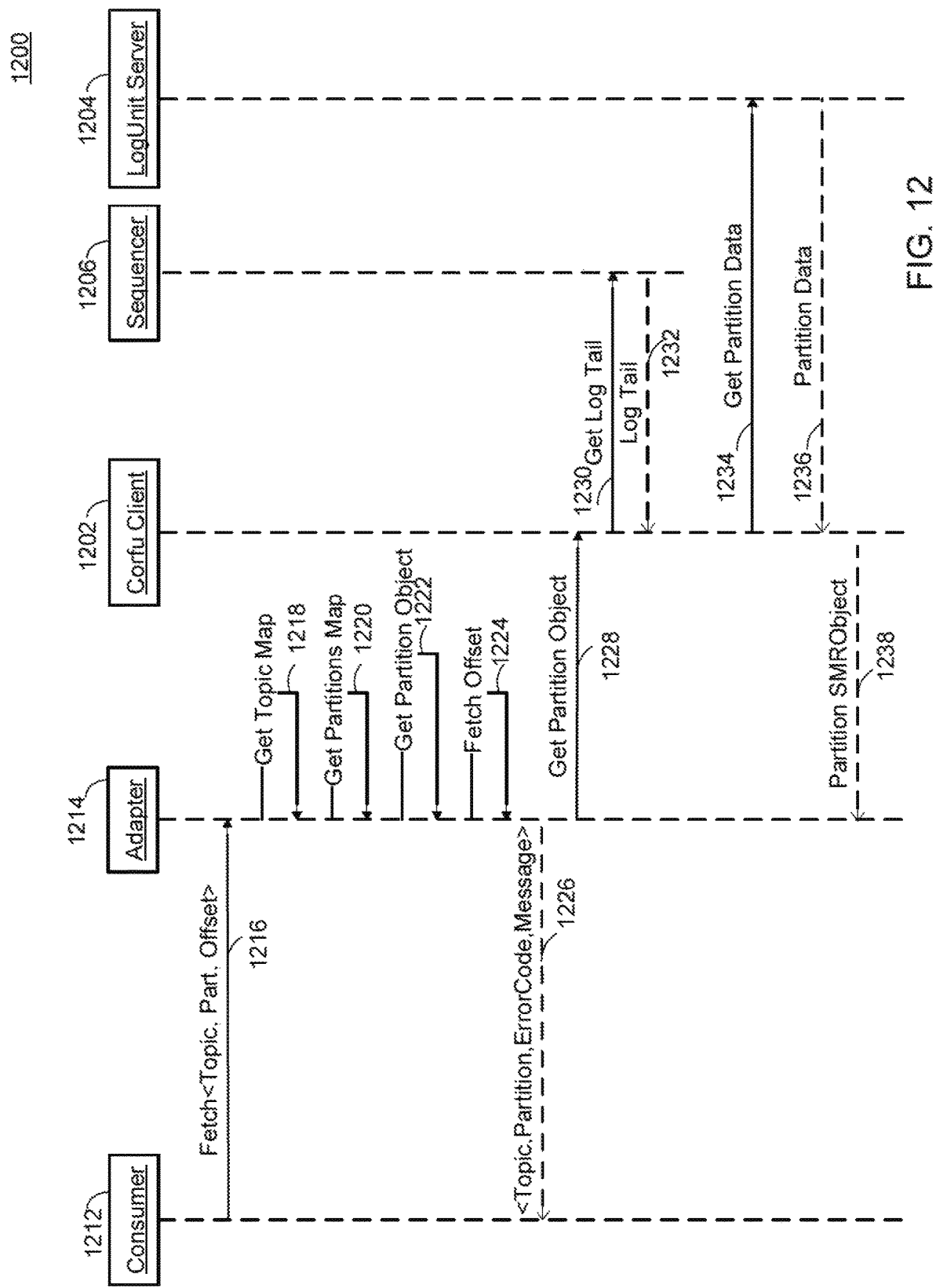
FIG. 12 is a sequence diagram of a second embodiment of an operation carried out in the distributed shared log storage system to support the fetch operation depicted in FIG. 6.

FIG. 12 is a sequence diagram of a second embodiment of an operation carried out in the distributed shared log storage system to support the fetch operation depicted in FIG. 6. In FIG. 12, a consumer 1212 sends a fetch request in step 1216 to adapter 1214, which responds by accessing the topic map in step 1218 and the partitions map in step 1220. Adapter 1214 then obtains the partition object in step 1222 and fetches the data at the specified offset in step 1224. Adapter 1114 then returns the data to consumer 1212 in step 1126.

As a background process, adapter 1214 performs a log tail and data refresh. These refreshes reduce the amount of work performed when the client requests data. Refresh is implemented as a continuous polling of the metadata to track append operations to the Corfu log. To perform these refreshes, adapter 1214 requests the partition object from Corfu client 1202 in step 1228. In response, Corfu client 1202 requests in step 1230 and receives in step 1232 the log tail from sequencer 1206, and requests in step 1234 and receives in step 1236 the partition data from the log unit server 1204. Corfu client 1202 then passes the requested partition object to adapter 1214 in step 1238. Thus, adapter 1214 in this embodiment keeps an in-memory representation of the metadata. This in-memory representation is continuously refreshed in the background. Given the sequential behavior of topic accesses, it is beneficial to hold in memory the data using pre-fetching techniques for subsequent accesses.

Figure 13:
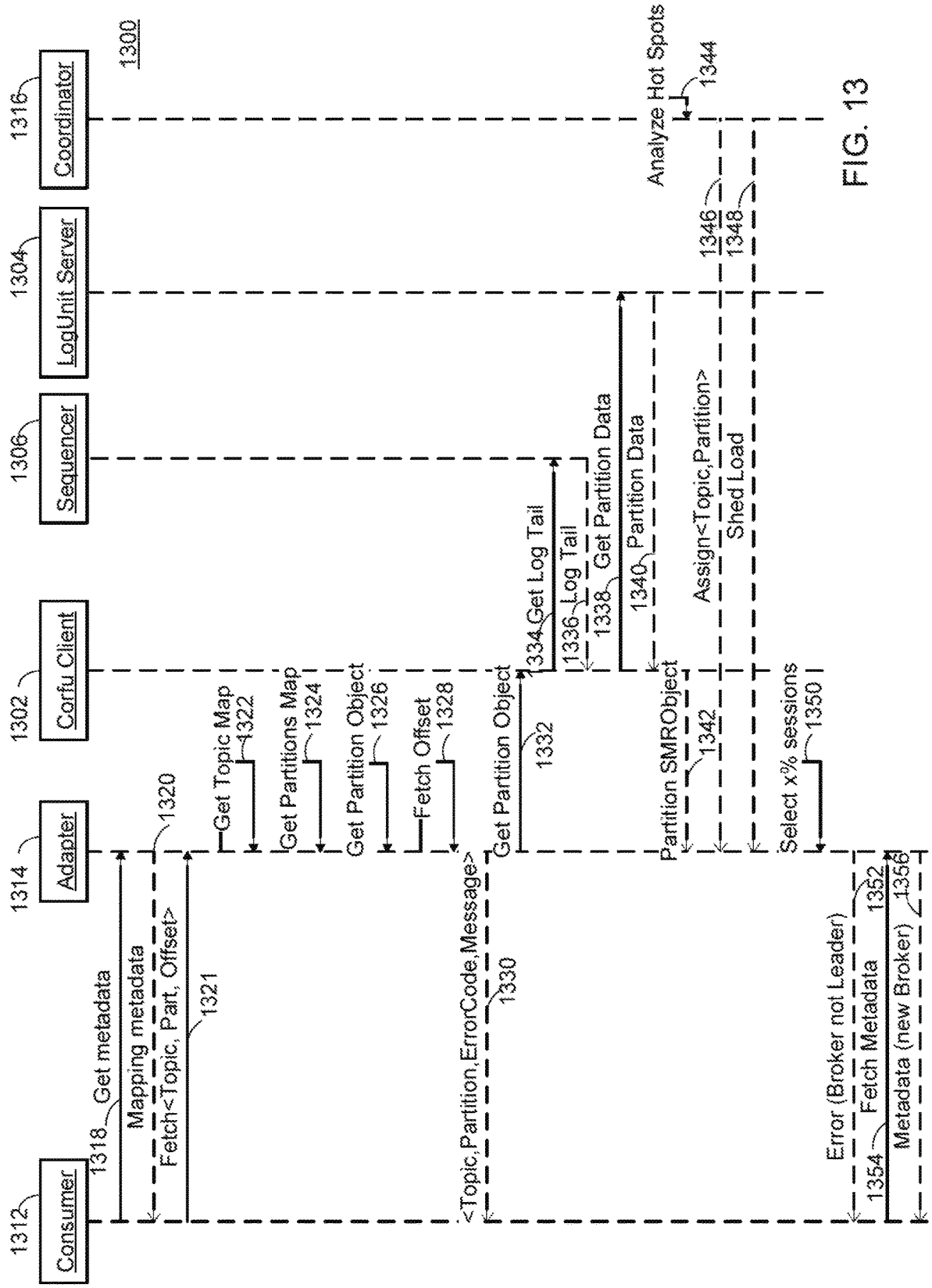
FIG. 13 is a sequence diagram of a third embodiment of an operation carried out in the distributed shared log storage system to support the fetch operation depicted in FIG. 6.

FIG. 13 is a sequence diagram of a third embodiment of an operation carried out in the distributed shared log storage system to support the fetch operation depicted in FIG. 6. In FIG. 13, a consumer 1312 requests from adapter 1314 in step 1318 and obtains metadata in step 1320. The metadata includes registry, i.e., a list of brokers and the <topic, partition> metadata they own. Adapter 1314 then receives a Fetch<Topic, Partition, Offset> that includes the topic and offset in step 1321, accesses the topic map in step 1322 and the partitions map in step 1324, and then accesses the partition object in step 1326. Adapter 1314 then obtains the data at the specified offset in step 1328 and returns it to consumer 1312 in step 1330. In this embodiment, the initial allocation of <topic, partitions> to specific brokers is based on the hardware configuration and in the embodiment, each Kafka client gets the same registry, i.e., for a given <topic, partition>, it returns the address of the same broker.

As a background process, adapter 1314 refreshes the partition object and log tail by first requesting the partition object from Corfu client 1302 in step 1332, which then requests in step 1334 and obtains in step 1336 the log tail from sequencer 1306 and the partition data from the log unit server 1304 in steps 1338 and 1340. Corfu client 1302 then refreshes adapter 1314 in step 1342 with the requested partition object.

Additionally, in the background, a coordinator 1316, which is an additional node within the Corfu cluster, analyzes hotspots in the Corfu platform in step 1344 and informs adapter 1314 of any re-assigned topics and partitions in step 1346. In step 1348, the Coordinator performs a shed load operation which allows load balancing across the cluster, in which incoming requests are redirected to any node within the cluster to avoid any one particular node from becoming a bottleneck or hotspot. In step 1350, select x % session occurs in which a heuristic is applied to move a certain percentage of the current traffic on the node to another node within the cluster. In one embodiment, the percentage selection rule is: if load >90%, then select 25% of the load to move; if load >75%, then select 5% of the load to move; if the load is <75%, do not move any of the load.

Finally, adapter 1314 notifies consumer 1312 in step 1352 of any errors or failures, such as when a particular broker is not a leader for a given <topic, partition>. Consumer 1312 can then request in step 1354 and receive in step 1356 metadata from adapter 1314 to discover a new broker.

Figure 14:
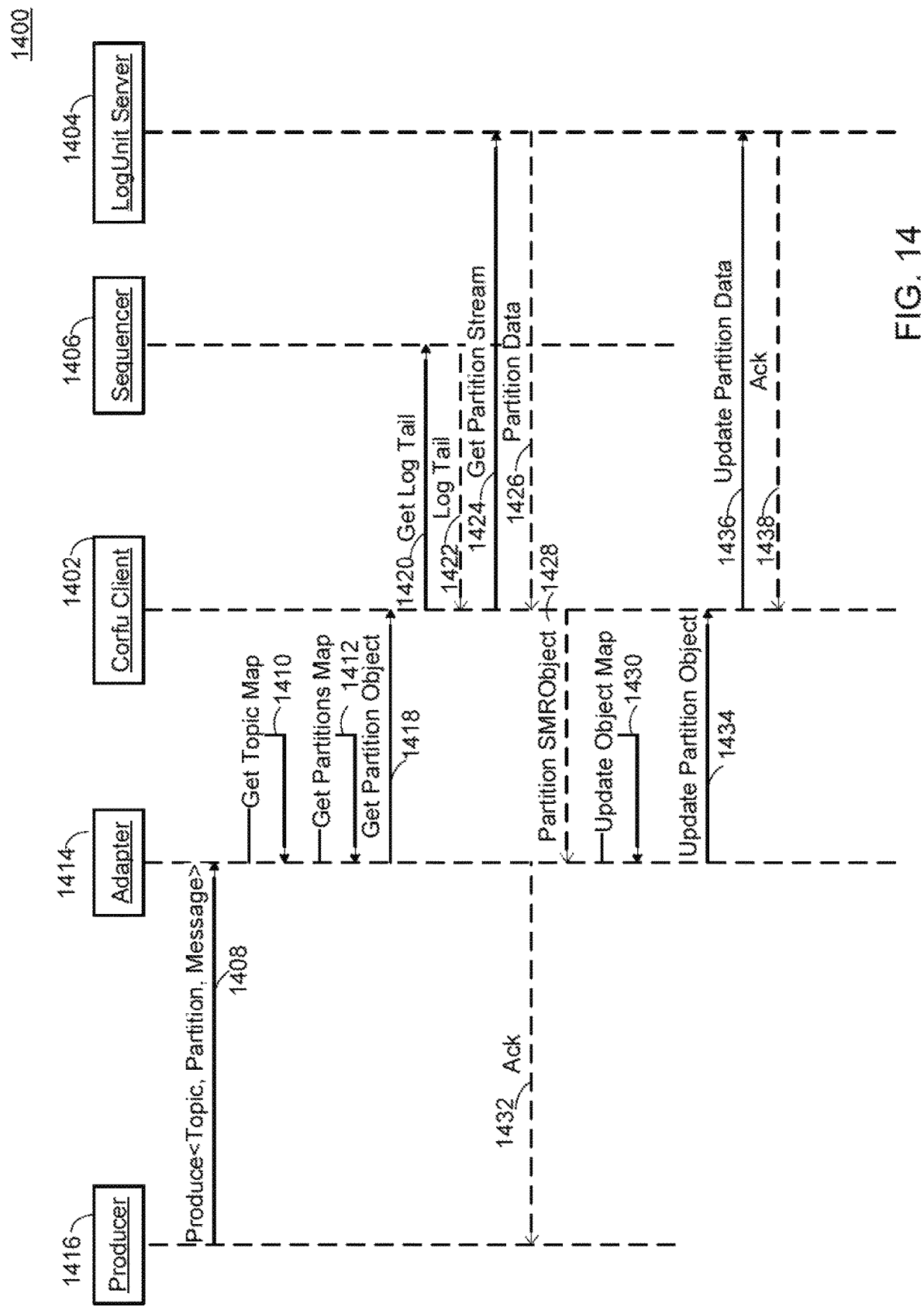
FIG. 14 is a sequence diagram of an operation carried out in the distributed shared log storage system to support the produce operation depicted in FIG. 6.

FIG. 14 is a sequence diagram of an operation carried out in the distributed shared log storage system to support the produce operation depicted in FIG. 6. In the figure, a Kafka Producer 1416 sends a Produce<Topic, Partition, Message> tuple to adapter 1414. Adapter 1414 then obtains the topic map in step 1410 and the partition map in step 1412, and then requests in step 1418 and gets in step 1428 the partition object. Corfu client 1402 obtains the log tail in steps 1420 and 1422 and the partition data in steps 1424 and 1426. When the partition object is delivered in step 1428, adapter 1414 updates in step 1430 the partition object with the new message and provides in step 1432 an acknowledgement back to Producer 1416. Adapter 1414 also updates the partition object in the Corfu system in step 1434 by requesting in step 1436 that the new data be appended to the storage page in log unit server 1404 for which it receives and acknowledgment in step 1438.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for processing an application according to a profile, comprising:
    receiving at an interface a request for an operation relating to the application with which the interface is associated, the request including a profile object containing a plurality of profile entries, wherein each profile entry includes a profile parameter associated with an operation and the profile parameter specifies a type of processing to be applied to the operation, wherein the type of processing specified by the profile parameter is at least one of conflict detection, concurrency control, replica repair, replication, failure detection, failure recovery, caching, tiering, data access optimization, load balancing, auto scaling, continuous monitoring, configuration management, security, or upgrade maintenance;
    parsing the profile object and, based on the profile parameter, selecting one or more library processing modules needed for processing the operation, the selected library processing modules being ones selected from a plurality of library processing modules available and arranged in a predetermined order;
    making active the selected library processing modules; and
    processing the operation according to the selected library processing modules,
    wherein the one or more library processing modules include at least one module for conflict detection, concurrency control, replica repair, replication, failure detection, failure recovery, caching, tiering, data access optimization, load balancing, auto scaling, continuous monitoring, configuration management, security, or upgrade maintenance.

2. The method of claim 1, wherein the profile parameter is an ordering parameter that specifies global ordering for the operation, the global ordering being enforced by a single global sequencer.

3. The method of claim 1, wherein the profile parameter is an ordering parameter that specifies local ordering for the operation, the local ordering being enforced by one sequencer in a set of distributed sequencers.

4. The method of claim 1, wherein the profile parameter is a replication parameter that specifies chain replication for the operation.

5. The method of claim 1, wherein the profile parameter is a replication parameter that specifies quorum replication for the operation.

6. The method of claim 1, wherein the operation is a read operation that includes reading a portion of a log of a persistent storage system that contains data requested by the read operation, the log being a read-many, write-append log.

7. The method of claim 1, wherein the operation is a read operation that includes reading data from a cache that contains data requested by the read operation.

8. The method of claim 1,
    wherein the request is a read operation specifying a topic, partition within the topic, and an offset within the partition;
    wherein the profile object contains an entry for each topic; and
    wherein the read operation is performed according to the parameter in the entry of the profile object.

9. A system for processing an application according to a profile, the system comprising:
    a plurality of storage units containing a read-many write-append log storing a persistent data of the application, the log having portions distributed over the plurality of storage units; and
    an application computer, the computer comprising (a) a memory storing instructions, and (b) at least one hardware processor to execute the instructions, the application computer being coupled to the plurality of storage units and configured to access data stored in the log, the application computer running the application and having an instance of an adaptor, wherein the adaptor is configured to execute the instructions to:
        receive at an interface a request for an operation relating to the application with which the interface is associated, the request including a profile object containing a plurality of profile entries, wherein each profile entry includes a profile parameter associated with an operation and the profile parameter specifies a type of processing to be applied to the operation, wherein the type of processing specified by the profile parameter is at least one of conflict detection, concurrency control, replica repair, replication, failure detection, failure recovery, caching, tiering, data access optimization, load balancing, auto scaling, continuous monitoring, configuration management, security, or upgrade maintenance;

parse the profile object and, based on the profile parameter, select one or more library processing modules needed for processing the operation, the selected library processing modules being ones selected from a plurality of library processing modules available and arranged in a predetermined order;

make active the selected library processing modules; and process the operation according to the selected library processing modules, wherein the one or more library processing modules include at least one module for conflict detection, concurrency control, replica repair, replication, failure detection, failure recovery, caching, tiering, data access optimization, load balancing, auto scaling, continuous monitoring, configuration management, security, or upgrade maintenance.

10. The system of claim 9, wherein the profile parameter is an ordering parameter that specifies a type of ordering for the operation.

11. The system of claim 9, wherein the profile parameter is a replication parameter that specifies a type of replication for the operation.

12. The system of claim 9, wherein the operation is a read operation that includes reading a portion of the log that contains data requested by the read operation.

13. The system of claim 9, wherein the operation is a read operation that includes reading data from a cache in the instance of the adapter that contains data requested by the read operation.

14. The system of claim 9,
wherein the request is a read operation specifying data from a topic, partition within the topic, and an offset within the partition; and
wherein processing the operation according to the selected library processing modules includes:
obtaining a data object containing the requested data by accessing one or more maps to obtain the data object;
determining a position in the obtained object of the requested data; and
returning the requested data.

15. The system of claim 14, wherein the requested data is returned before accessing the log.

16. The system of claim 14, wherein the requested data is returned after accessing the log.

17. A non-transitory computer-readable medium containing instructions, which when executed by one or more processors, performs a method for processing an application according to a profile, the method comprising:
receiving at an interface a request for an operation relating to the application with which the interface is associated, the request including a profile object containing a plurality of profile entries, wherein each profile entry includes a profile parameter associated with an operation and the profile parameter specifies a type of processing to be applied to the operation, wherein the type of processing specified by the profile parameter is at least one of conflict detection, concurrency control, replica repair, replication, failure detection, failure recovery, caching, tiering, data access optimization, load balancing, auto scaling, continuous monitoring, configuration management, security, or upgrade maintenance;

parsing the profile object and, based on the profile parameter, selecting one or more library processing modules needed for processing the operation, the selected library processing modules being ones selected from a plurality of library processing modules available and arranged in a predetermined order;

making active the selected library processing modules; and processing the operation according to the selected library processing modules, wherein the one or more library processing modules include at least one module for conflict detection, concurrency control, replica repair, replication, failure detection, failure recovery, caching, tiering, data access optimization, load balancing, auto scaling, continuous monitoring, configuration management, security, or upgrade maintenance.

18. The medium of claim 17, wherein the parameter is an ordering parameter that specifies a type of ordering for the operation.

19. The medium of claim 17, wherein the parameter is a replication parameter that specifies a type of replication for the operation.

20. The medium of claim 17, wherein the operation is a read operation that includes reading a portion of a log of a persistent storage system that contains data requested by the read operation, the log being a read-many, write-append log.

* * * * *